United States Patent
Oosthoek et al.

(10) Patent No.: US 11,756,455 B2
(45) Date of Patent: Sep. 12, 2023

(54) ELECTRONIC SHELF LABEL SYSTEM WITH POSITIONED VIRTUAL SHELF LABELS AND A METHOD OF POSITIONING SAID VIRTUAL SHELF LABELS

(71) Applicant: SES-Imagotag GmbH, Fernitz-Mellach (AT)

(72) Inventors: Jan Oosthoek, Ladsmeer (NL); Andreas Roessl, Graz (AT)

(73) Assignee: SES-IMAGOTAG GmbH, Fernitz-Mellach (AT)

( * ) Notice: Subject to any disclaimer, the term of this patent is extended or adjusted under 35 U.S.C. 154(b) by 0 days.

(21) Appl. No.: 16/762,729

(22) PCT Filed: Nov. 10, 2017

(86) PCT No.: PCT/EP2017/078845
§ 371 (c)(1),
(2) Date: May 8, 2020

(87) PCT Pub. No.: WO2019/091566
PCT Pub. Date: May 16, 2019

(65) Prior Publication Data
US 2021/0407325 A1    Dec. 30, 2021

(51) Int. Cl.
*G09F 3/20* (2006.01)
*G09G 5/00* (2006.01)

(52) U.S. Cl.
CPC ............ *G09F 3/208* (2013.01); *G09F 3/204* (2013.01); *G09G 5/006* (2013.01);
(Continued)

(58) Field of Classification Search
CPC ........ G06F 3/14; G06F 3/1446; G06F 3/1454; G06F 3/144; G06F 3/147; G06Q 30/0241;
(Continued)

(56) References Cited

U.S. PATENT DOCUMENTS

| | | | |
|---|---|---|---|
| 2010/0001924 A1* | 1/2010 | Nobutsugu | G09F 9/302 345/1.1 |
| 2013/0226742 A1* | 8/2013 | Johnson | G06Q 10/087 705/27.1 |

(Continued)

FOREIGN PATENT DOCUMENTS

| | | | | |
|---|---|---|---|---|
| CN | 104021406 A | * | 9/2014 | G06K 17/00 |
| KR | 20110085332 A | * | 7/2011 | G06F 3/041 |

OTHER PUBLICATIONS

English machine translation for KR20110085332. (Year: 2011).*

*Primary Examiner* — Yuzhen Shen
(74) *Attorney, Agent, or Firm* — Dennemeyer & Associates, LLC.

(57) ABSTRACT

The invention relates to an electronic shelf label system that comprises a server for delivering shelf label display information to a number of display devices that are controlled by the server to display said shelf label display information on their screens, wherein said screen is designed to display video content represented by received video data, and said display device is designed to deliver video data to a screen and to receive label positioning data for defining the position of the shelf label display information in the display area of at least one of the screens connected to it, and to embed the shelf label display information in accordance with the received location data in the video content that is delivered to said screen.

4 Claims, 2 Drawing Sheets

(52) U.S. Cl.
CPC . *G09G 2340/0464* (2013.01); *G09G 2370/16* (2013.01); *G09G 2380/04* (2013.01)

(58) Field of Classification Search
CPC ............ G09F 3/204; G09F 3/20; G09F 3/208; G09G 5/006; G09G 5/12; G09G 5/14; G09G 2340/0464; G09G 2340/12; G09G 2354/00; G09G 2370/16; G09G 2380/04; G09G 2380/06
See application file for complete search history.

(56) References Cited

U.S. PATENT DOCUMENTS

| | | | | |
|---|---|---|---|---|
| 2014/0002471 | A1* | 1/2014 | Yeo | H04H 20/08 345/581 |
| 2016/0134930 | A1* | 5/2016 | Swafford | A47F 5/0068 725/80 |

* cited by examiner

ELECTRONIC SHELF LABEL SYSTEM WITH POSITIONED VIRTUAL SHELF LABELS AND A METHOD OF POSITIONING SAID VIRTUAL SHELF LABELS

CROSS-REFERENCE TO RELATED APPLICATIONS

This is a 35 U.S.C. 371 National Stage Patent Application of International Application No. PCT/EP2017/078845, filed Nov. 10, 2017 which is hereby incorporated by reference in its entirety.

TECHNICAL FIELD

The invention relates to an electronic shelf label system with positioned electronic shelf labels and a method of positioning said electronic shelf lab.

BACKGROUND

Known electronic shelf label (ESL) systems comprise a number of ESLs attached to predefined positions on shelf rails, a server for managing the display content to be displayed on the individual ESLs, and some access points connected to the server to rout display content to the individual ESLs. The ESLs are typically assigned in groups to each access point.

The known ESL system is very difficult to manage. In particular, one of the major problems is the exact positioning of the ESLs on the shelf rail. Today this can only be achieved by manual interaction of the staff in the retail shop. Often the ESLs are mechanically secured against theft at the shelf rail. Such theft protection measures prevent a flexible positioning at arbitrary positions along the shelf rail. Hence, the ESLs can only be positioned at mechanically predefined positions. The technical measures used lack in terms of user friendliness. They require cumbersome and therefore time-consuming user interaction in order to unlock the theft protection, change the location of the ESL and secure it again at a new shelf rail position.

Therefore, the object of the invention is to provide a system that avoids the problems discussed above and that allows the precise, flexible and rapid positioning of ESLs at proper positions on or along a shelf rail.

SUMMARY OF THE INVENTION

This object is achieved by a system according to claim 1. Therefore, the subject matter of the invention is an electronic shelf label system, comprising a server for delivering shelf label display information to a number of display devices that are controlled by the server to display said shelf label display information on their screens, wherein said screen is designed to display video content represented by received video data, and said display device is designed to deliver video data to a screen and to receive label positioning data for defining the position of the shelf label display information in the display area of at least one of the screens connected to it, and to embed the shelf label display information in accordance with the received location data in the video content that is delivered to said screen.

The object is also achieved according to claim 5. Therefore, the subject matter of the invention is a method of positioning an electronic shelf label comprising the steps of delivering from a server shelf label display information to a number of display devices that are controlled by the server to displayed said information on their screens, wherein said screen is designed to display video content represented by received video data, and said display device receives label positioning data for defining the position of the shelf label display information in the display area of at least one of the screens connected to it and embeds the shelf label display information in accordance with the received label positioning data in the video content that is delivered to said screen.

The measures according to the invention provide the advantage that the shelf label display information is no longer displayed on a physical, individual electronic shelf label device. The shelf label display information is now displayed as content (or as virtual electronic shelf label) on a video screen that realizes a shelf rail or that is attached to the front of a shelf rail. Hence its placement or its adjustment of the position along the shelf rail is now achieved by processing label positioning data on the side of the display device that controls the respective screen on which the shelf label information is displayed. In strong contrast to known electronic shelf labels that are physical attached on shelf rails no more physical interaction of a user with an ESL is required to adjust the position of a shelf label, e.g. to center its position along a particular group of products placed on a shelf floor. This eases the adjustment of the position of the ESL information significantly and first time ever allows a fully computer controlled ESL management process.

Further particularly advantageous designs and extensions of the invention arise from the dependent claims and the following description. Advantages mentioned in the context of one category of claims do also apply to the other category of claims. Features of one category of claims may be further developed according to the features of another category.

The server that controls the electronic shelf label display information, e.g. product and/or product price information, and its distribution to the individual display devices may be part of an in-shop logistics application of a retailer's shop. The server may be different from a video distribution server used for distribution of video data representing video content to the display devices. The video content may be played back e.g. as background video. However, it may be of advantage to perform the task of distribution of the video data and distribution of the shelf label display information by one and the same server.

In particular the entire video data of a background video is downloaded upfront to playback start at the devices. During playback, the devices synchronize their playback progress by means of broadcasting their progress data and aligning their individual playback progress to the most advanced progress within the group of display devices. This progress synchronization may be performed by using the frame numbers of video data structured in frames that are labeled by said frame numbers.

Independent thereof various shelf label display information together with label positioning data are distributed to the individual display devices. Distribution is performed by addressing the individual display devices, wherein the server knows about the location of particular goods on a particular shelf. The server also knows which display device is operated at the respective shelf, in particular at which shelf floor, and the link to the appropriate shelf label display information. The data required are stored in a database of the server.

For the sake of clarity, it is mentioned that the communication between the server and the devices as well as the communication between the devices (e.g. for synchronization of its video playback progress) may be realized either by means of wires, e.g. two wire or bus systems, or radio signals.

At the display devices, the label positioning data are used to locate the electronic shelf label information within the display area of the screen(s) that is (are) controlled by the respective display device. This allows rough positioning of the shelf label display information that is linked to a particular product. Fine tuning of the positioning may be performed by a user's visual check of the position and further amendments of the positioning data at the server's user interface. As the shelf to be checked is typically not located in visible range of the server's location, this may lead to a cumbersome process to adjust the positioning of the shelf label display information to its desired position.

In order to improve the positioning process, it is of advantage that said display device comprises a position-control interface for receiving said label positioning data from a remote-control device that is different from the server. The employee may utilize the remote control directly in front of the shelf concerned. This allows an employee of a retail shop to improve positioning through immediate visual control.

According to one embodiment, the employee may use a remote control that allows only the shift of the display information either to the left or to the right by two different buttons. However, according to a further aspect of the invention it is of advantage that the remote control comprises a remote-control display and is designed to execute an application that is designed to visualize on the remote-control display a representation of the display area of said screen, and a representation of said shelf label display information within said display area. Now the user of the remote control may vary the position within visualized boundaries of the screen's display area, which makes the positioning of the display information much easier.

Further to this, it is of particular advantage that the application is designed to detect a user interaction regarding the movement and/or positioning of the representation of the shelf label display information on the remote-control display. This allows the use of modern tablet computers with touch screens as basis for the user control software application. The user interaction with the touch screen triggers the generation of interaction data delivered via a touch screen interface and the application is deigned to generate the label positioning data therefrom. The label positioning data may be transmitted from the remote control to the server and forwarded from the server to the display device concerned. However, according to a preferred embodiment, the application is designed to directly transmit the label positioning data to the display device over its remote-control interface that is compatible with the position control interface of the display device. This in fact allows an ad hoc adjustment of the positioning of the display information without the interaction or involvement of said server. This is of particular advantage if the shelf label display information is positioned only once by the server during an initialization phase. Thereafter adjustments of the position are performed under the direct control of the remote control, which immediately after detection user interaction adjusts the position of the display information at the display device concerned.

The display device concerned by the position adjustment process for individual shelf label display information may be selected from a list of available devices within a communication range of the remote control.

Data exchange between the display device concerned and the remote control may be achieved e.g. by a Wi-Fi connection. Hence, the position-control interface on the one side and the remote-control interface on the other side must be designed to enable communication according to the same protocol or standard, respectively.

Further to this it may be of advantage that also the user control has the background video available and plays it back on its screen while user interaction within the representation of the screen area of one of the screens is detected. This allows an improved adjustment of the position of the shelf label display information now also taking the influence of the adjustment on the user perception of the background video into account while focusing only on the remote-control display.

Given the fact that in a large retail store a huge number of shelf rails may exist, it is of utmost economic benefit to utilize flexible solutions for the position adjustment. Here the measures according to the invention enable a very fast and precise optimization of the position of the electronic shelf label display information for individual shelf rails.

The features of the invention may be realized by means of pure hardware or of programmable hardware on which a software is executed, e.g. microprocessors, microcontrollers or application specific circuits with memory devices to store the software are to be considered.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in.

DESCRIPTION OF THE EXEMPLARY EMBODIMENTS

Figure 1:
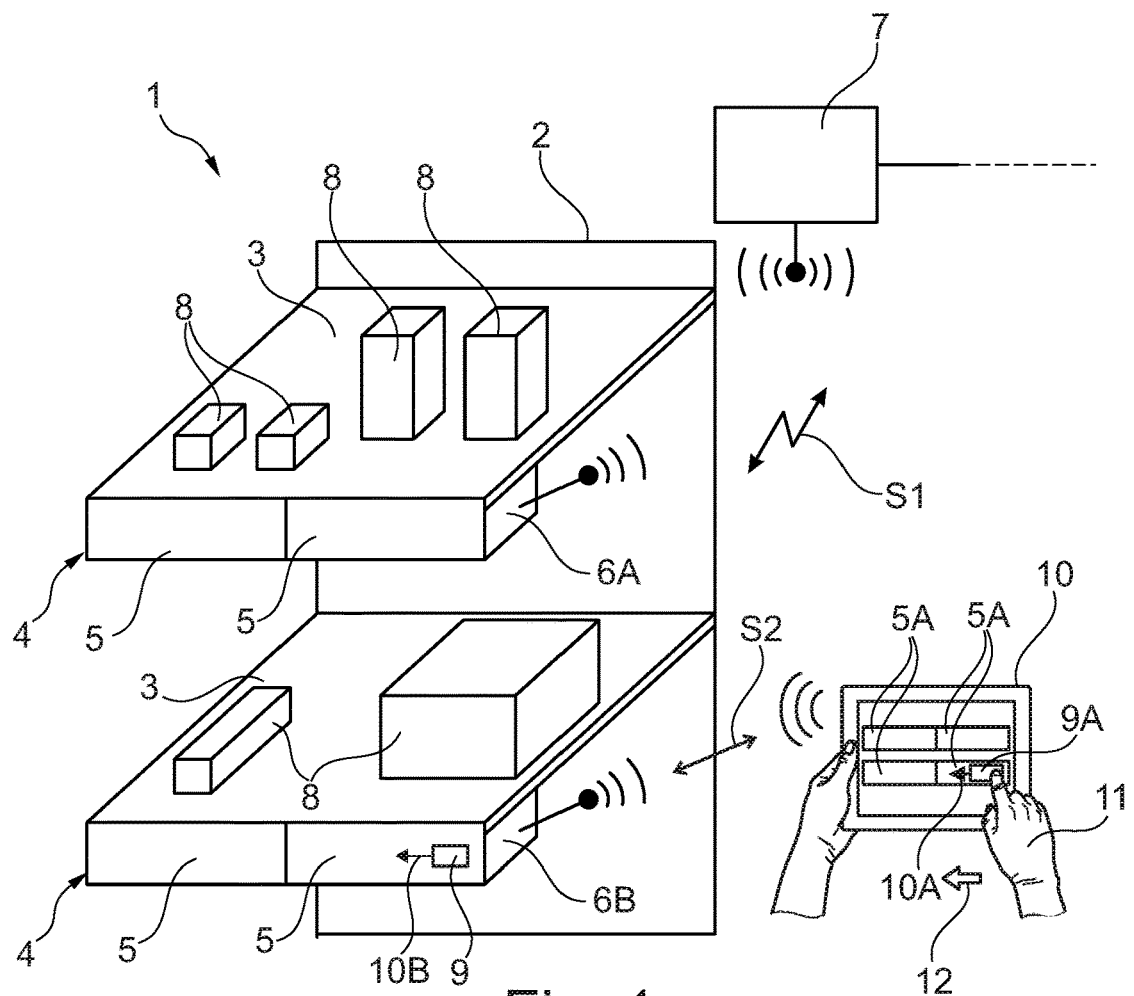
FIG. 1 a system according to the invention installed in a retail store.

FIG. 1 shows an electronic shelf label system 1 according to the invention. The system 1 is installed in a retail shop of which only a shelf 2 is shown. The shelf 2 has two shelf floors 3 on which goods 8 are placed. At its front, each shelf floor 3 comprises a shelf rail 4 (not shown in detail) to which two video screens 5 are attached along its entire length. Further to this two identical display devices 6A and 6B are shown. The first device 6A is connected to the screens on the upper floor 3 and the second device 6B is connected to the screens 5 on the lower floor 3.

The video content (film) to be displayed on the screens 5 is supplied by a server 7 via a radio signal S1 to both devices 6A and 6B. The video content is delivered in form of compressed video data that are structured in frames labeled by frame numbers.

The right video screen 5 on the lower shelf floor 3 displays a virtual electronic shelf label 9, in fact shelf label display information that replaces the video content shown on the screen 5 at its position. According to the present example it is assumed that the position of the virtual label 9 is not perfect and it shell therefore be shifted to the left as indicated by arrow 10B.

In order to achieve this, the display device 6B of the lower shelf floor 3 is in radio based Wi-Fi connection S2 with a remote-control device 10 that is realized by a tablet computer. The remote-control device 9 executes a remote-control application that allows user interaction for the position adjustment of the virtual label 9. The remote-control application uses the touch screen interface of the tablet to visualize a first representation 5A of the four video screens 5 of the shelf 2. The touch screen interface detects the interaction with a finger of a user's hand that touches the area showing a second representation 9A of the virtual label 9 and its move to the left according to the arrow 10A. This movement on the touch screen is reported to the application that derives positioning data therefrom and communicates it via the Wi-Fi connection S2 to the device 6B. The device 6B receives the positioning data and adjusts the position at which the virtual label 9 is displayed accordingly.

To be complete, according to one embodiment the remote-control device 10 may be in connection with all the display devices 6A, 6B of a single shelf 2 or even with the display devices of further shelfs. However, if only the position of virtual labels 9 displayed on a single screen 5 shall be adjusted it is sufficient to be in connection with only the respective display device. In the present case, it would be the display device 6B.

Figure 2:
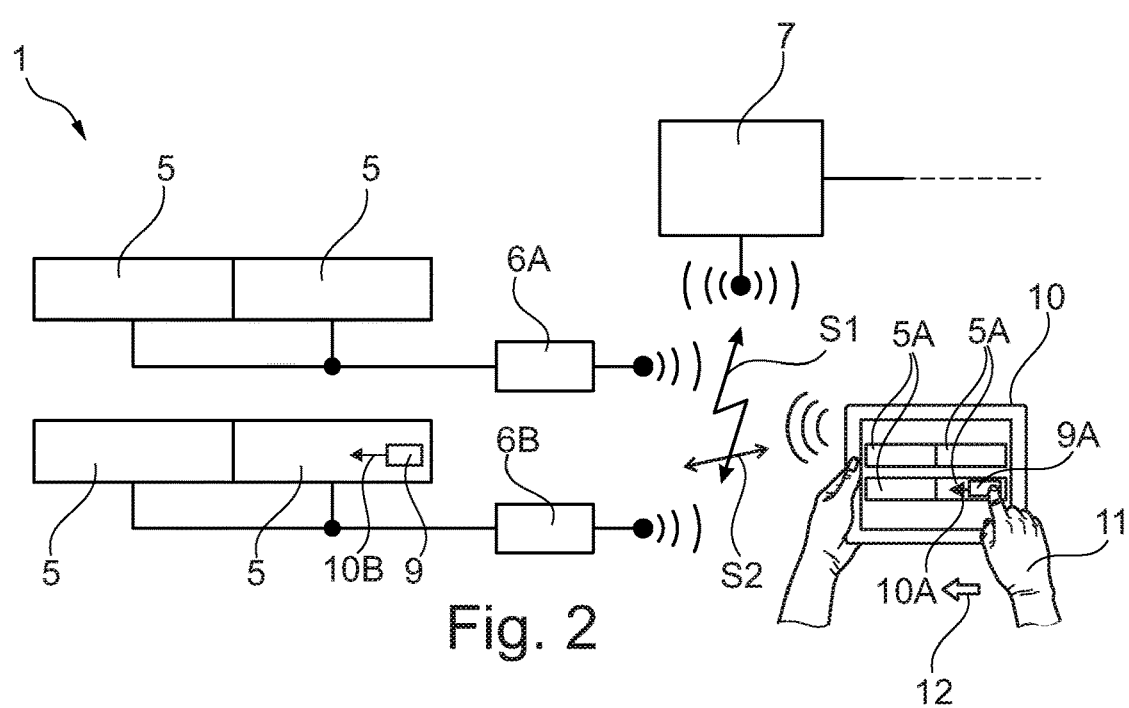
FIG. 2 a schematic view of components of the system.

FIG. 2 shows the components described in FIG. 1 in form of a block diagram without shelf 3 and the products 8. Here a wire-based connection of the devices 6A and 6B with their displays 5 is shown.

In the following the invention is explained by the aid of FIGS. 3A and 3B that show the playback of a background video, in particular a mountaineering video 13 on the screens 5 while the position of one of the virtual electronic shelf labels 9 is adjusted.

Figure 3A:
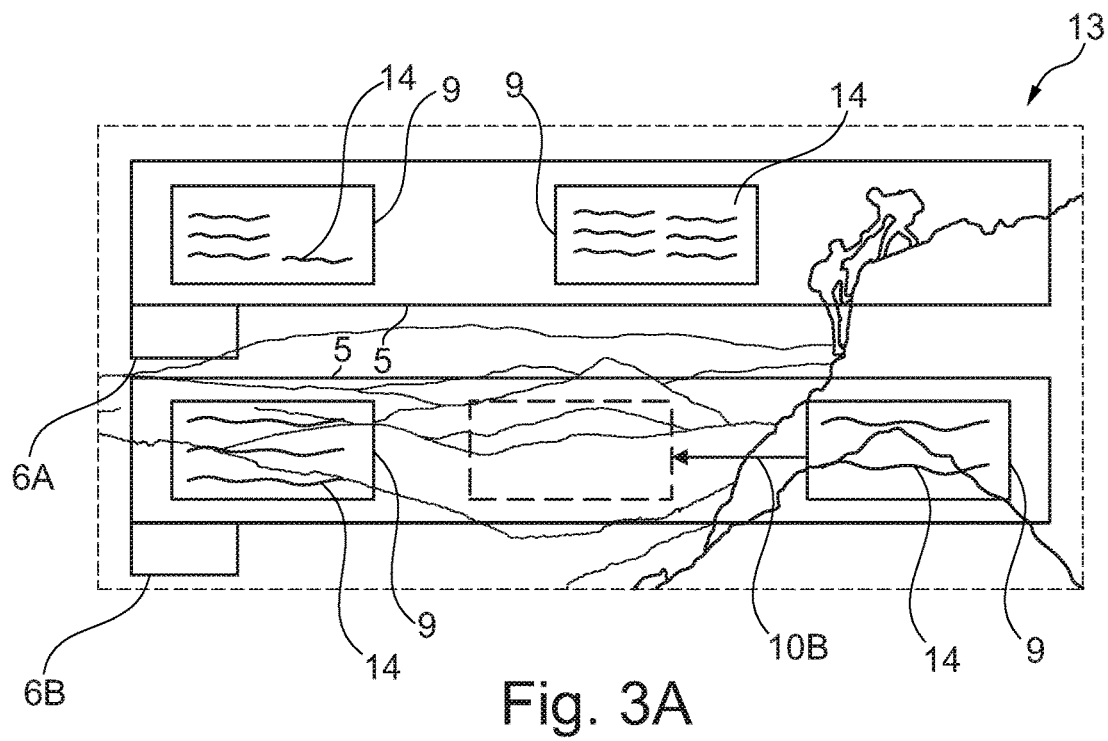
FIG. 3A—3B the operation of the system, in particular the positioning of a virtual electronic shelf label.

In particular FIG. 3A shows a snapshot of the video 13 that was distributed to the two display devices 6A and 6B by the server 7 before playback started on said devices 6A, 6B. According to this embodiment each device 6A, 6B drives a single screen 5 only.

Although the shelf 2 on which the screens 5 are installed is not shown in FIG. 3A, it is mentioned for the sake of clarity that each of the devices 6A, 6B controls the playback of its individual screen 5. Each of the screens 5 covers one of the shelf rails 4. Each shelf rail 4 forms the front of a shelf floor 3 on which in the present case mountaineering products (not shown) are presented. The two shelf floors 3 are arranged one above the other as part of the shelf 2.

The devices 6A and 6B were programmed by the server 7 with individual zoom/window settings to playback only a part (section) of the entire video picture of the video 13. Here the window for the upper screen 5 mounted on the upper shelf rail 4 is set to an upper part of the video 13 that shows in the snapshot two climbers reaching the top of a mountain. The window of the screen 5 on the bottom shelf rail 4 shows on its left side the view into the distant landscape while on its right part rocks in the foreground are visible in the snapshot.

The zoom on the individual sections of the video 13 is realized e.g. by the aid of a well-known video-feature called "viewbox". Although visible in FIG. 3A, the video content outside the two individual windows/zoom settings is simply not shown on the screens 5. However, in the spatial arrangement of the shelf 2 this area between the screens 5 is used to present products related to mountaineering.

This allows to spatially distribute the synchronized video experience over the two screens 5, in fact over the two shelf rails 4. Due to the spatial distribution of windows of the mountaineering video 13 over the two shelf rails 4, the mountaineering products are now presented in the appropriate adventure context.

In addition to this, FIG. 3A shows several shelf label display information 9 (also termed virtual electronic shelf labels) displayed at different positions where said mountaineering products are located on the shelf floors 3. Each individual display information 9 is embedded into to the video 13 by the devices 6A, 6B that drives the screen 5 concerned. The display information 9 may comprise static (textual) information related to product and/or price information indicated by wavy lines 14. However, the shelf label display information 9 may also comprise individual video sequences (not shown in the FIG. 3A) which are assigned to particular virtual electronic shelf labels.

Further to this, also the entire virtual electronic shelf label display information 9 or even individual areas of the screens 5 may be used to display an advertisement video that was initially distributed to the individual playback devices 6A, 6B and then played back distributed over the two shelf rail screens 5. Similar to the background video 13 the entire advertisement experience assembles from the distributed display of individual advertisement elements of the advertisement video played back in synchronous mode on the different screens 5. In this mode in fact two different videos—on the one hand the background video 13 and on the other hand said advertisement video—are played back simultaneously by the display devices 6A and 6B. The devices 6A and 6B may also playback a higher number of videos.

Figure 3B:
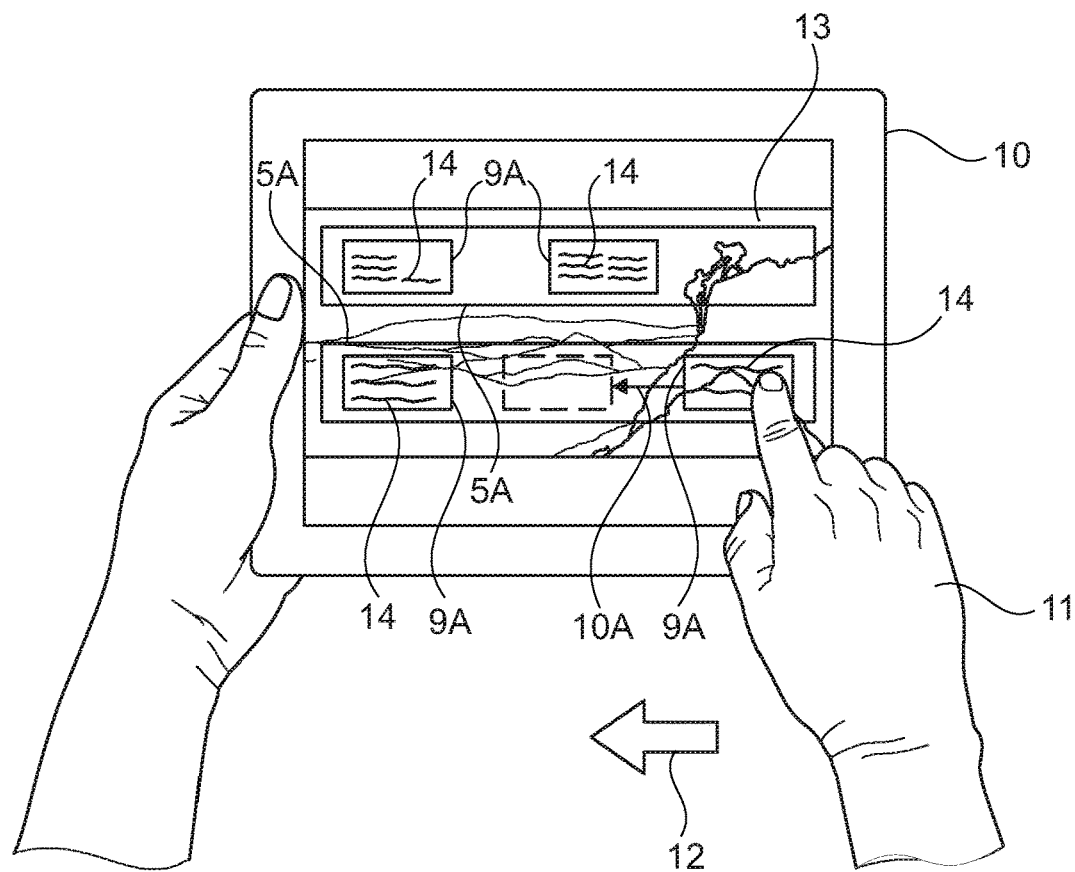

FIG. 3B now shows the adjustment of the lower-right shelf label display information 9A by the aid of the remote-control device 10 such that it is moved to the rectangle with hidden lines following the direction of arrow 10A. This user interaction on the remote-control device 10 is then executed on the second device 6B which leads to a shift of the shelf label display information 9 in FIG. 3A as indicated by arrow 10B.

Further to this it can be seen in FIG. 3B that during the position tuning process the remote-control device 10 plays back the background video 13 so that the user of the remote-control device 10 has a live experience of the position adjustment.

In summary, the method and the system of the invention allows the flexible use of virtual electronic shelf displays and the easy, wireless ad hoc fine tuning of the position of the virtual electronic shelf labels without any server involvement.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

What is claimed is:

1. Electronic shelf label system (1), comprising
    a server (7) for delivering shelf label display information (9) to a number of display devices (6A, 6B) that are controlled by the server (7) to display said shelf label display information (9) on their screens (5),
    wherein
    said screen (5) is designed to display video content (13) represented by received video data, and
    said display device (6A, 6B) is designed to deliver video data to a screen (5) and
    to receive label positioning data for defining the position of the shelf label display information (9) in the display area of at least one of the screens (5) connected to it, and to embed the shelf label display information (9) in accordance with the received location data in the video content that is delivered to said screen (5), wherein said display device (6A, 6B) comprises a position-control interface for receiving said label positioning data generated by a remote-control device (10) that is different from the server (7), without the interaction or involvement of the server (7) and wherein the remote-control (10) comprises a remote-control display and is designed to execute an application that is designed to visualize on the remote-controlled display a representation (5A) of the display area of said screen (5), and a representation (9A) of said shelf label display information (9) within said display area.

2. The system (1) according to claim 1, wherein the application is designed to detect a user interaction regarding the movement and/or positioning of the representation (9A) of the shelf label display information (9) on the remote-control display, and to generate the label positioning data therefrom, and to transmit the label positioning data to the display device (6A, 6B) over its remote-control interface that is compatible with the position-control interface of the display device (6A, 6B).

3. A method of positioning an electronic shelf label comprising the steps of delivering from a server (7) shelf label display information (9) to a number of display devices (6A, 6B) that are controlled by the server (7) to display said information on their screens (5), wherein said screen (5) is designed to display video content (13) represented by received video data, and said display device (6A, 6B)

receives label positioning data for defining the position of the shelf label display information (9) in the display area of at least one of the screens (5) connected to it and embeds the shelf label display information (9) in accordance with the received label positioning data in the video content (13) that is delivered to said screen (5), wherein said display device (6A, 6B) receives said label positioning data generated by a remote-control device (10) that is different from the server (7) via its position-control interface, without the interaction or involvement of the server (7), and wherein the remote-control (10) comprises a remote-control display and is designed to execute an application that is designed to visualize on the remote-controlled display a representation (5A) of the display area of said screen (5), and a representation (9A) of said shelf label display information (9) within said display area.

4. The method according to claim 3, wherein the application detects a user interaction regarding the movement and/or positioning of the representation (9A) of the shelf label display information (9) on the remote-control display, and generates the label positioning data therefrom, and transmits the label positioning data to the display device (5A, 5B) over its remote-control interface that is compatible with the position-control interface of the display device (6A, 6B).

\* \* \* \* \*